US012231967B2

United States Patent
Wei et al.

(10) Patent No.: US 12,231,967 B2
(45) Date of Patent: Feb. 18, 2025

(54) DEVICES AND METHODS FOR SUPPORTING HANDOVER OF UE

(71) Applicant: Huawei Technologies Co., Ltd., Shenzhen (CN)

(72) Inventors: Qing Wei, Munich (DE); Riccardo Trivisonno, Munich (DE); Apostolos Kousaridas, Munich (DE); Emmanouil Pateromichelakis, Munich (DE); Mirko Schramm, Berlin (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 441 days.

(21) Appl. No.: 17/670,771

(22) Filed: Feb. 14, 2022

(65) Prior Publication Data

US 2022/0167217 A1  May 26, 2022

Related U.S. Application Data

(63) Continuation of application No. PCT/EP2019/071882, filed on Aug. 14, 2019.

(51) Int. Cl.
*H04W 36/00* (2009.01)
*H04W 28/02* (2009.01)
(Continued)

(52) U.S. Cl.
CPC ... *H04W 36/0044* (2013.01); *H04W 28/0268* (2013.01); *H04W 28/24* (2013.01); *H04W 36/08* (2013.01)

(58) Field of Classification Search
CPC ......... H04W 36/0044; H04W 28/0268; H04W 28/24; H04W 36/08
See application file for complete search history.

(56) References Cited

U.S. PATENT DOCUMENTS

2018/0115927 A1* 4/2018 Vesterinen ........ H04W 36/0055
2018/0227976 A1   8/2018 Dudda et al.
2019/0028920 A1   1/2019 Pan

FOREIGN PATENT DOCUMENTS

CN   108141899 A    6/2018
WO   2016171716 A1  10/2016
(Continued)

OTHER PUBLICATIONS

3GPP TR 23.786 V16.1.0 "3rd Generation Partnership Project; Technical Specification Group Services and System Aspects; Study on architecture enhancements for the Evolved Packet System (EPS) and the 5G System (5GS) to support advanced V2X services (Release 16)," Jun. 2019, 119 pages.
(Continued)

*Primary Examiner* — Samina F Choudhry
(74) *Attorney, Agent, or Firm* — Conley Rose, P.C.

(57) ABSTRACT

The present disclosure relates to handover (HO) of a user equipment (UE), which consumes a quality of service (QoS) flow that is associated with multiple QoS profiles. The disclosure proposes a network entity for supporting HO of the UE, and proposes a second network entity that is the target of HO of the UE. The network entity is configured to: obtain multiple QoS profiles associated with a QoS flow; obtain QoS capability information indicating whether the second network entity supports more than one QoS profile and/or whether a first network entity supports more than one QoS profile; and provide at least one message to the second network entity, wherein the at least one message includes at least one QoS profile according to the QoS capability information.

21 Claims, 14 Drawing Sheets

(51) Int. Cl.
*H04W 28/24* (2009.01)
*H04W 36/08* (2009.01)

(56) References Cited

FOREIGN PATENT DOCUMENTS

| WO | 2017123500 A1 | 7/2017 |
|---|---|---|
| WO | 2019081027 A1 | 5/2019 |
| WO | 2019158218 A1 | 8/2019 |
| WO | 2019158220 A1 | 8/2019 |

OTHER PUBLICATIONS

3GPP TS 22.101 V16.2.0, "3rd Generation Partnership Project; Technical Specification Group Services and System Aspects; Service aspects; Service principles (Release 16)," Jun. 2019, 104 pages.
3GPP TS 23.501 V16.1.0 "3rd Generation Partnership Project; Technical Specification Group Services and System Aspects; System Architecture for the 5G System; Stage 2 (Release 16)," Jun. 2019, 367 pages.
Huawei, et al., "Discussion Paper on mulitple QoS profile indexing alternatives," SA WG2 Meeting #134, Sapporo, Japan, Jun. 24-28, 2019, S2-1907422, 4 pages.
3GPP TS 23.203 V16.1.0 "3rd Generation Partnership Project; Technical Specification Group Services and System Aspects; Policy and charging control architecture (Release 16)," Jun. 2019, 262 pages.
Huawei, et al., "QoS Handling for V2X Communication Over Uu Reference Point," 3GPP TSG-SA2 Meeting #134, Sapporo, Japan, Jun. 24-28, 2019, S2-1907423, 5 pages.
3GPP TS 23.502 V16.1.1 3rd Generation Partnership Project; Technical Specification Group Services and System Aspects; Procedures for the 5G System; Stage 2(Release 16), Jun. 2019, 494 pages.
Huawei, et al., "Handling of Alternative QoS Profiles at handover," SA WG2 Meeting #136, Reno, NV, USA, Nov. 18-22, 2019, S2-1911545, 6 pages.
3GPP TS 23.287 V1.1.0 "3rd Generation Partnership Project; Technical Specification Group Services and System Aspects; Architecture enhancements for 5G System (5GS) to support Vehicle-to-Everything (V2X) services (Release 16)," Jul. 2019, 50 pages.
Huawei, et al., "QoS Handling for V2X Communication Over Uu Reference Point," 3GPP TSG-SA2 Meeting #134, Sapporo, Japan , Jun. 24-28, 2019, S2-1907424, 10 pages.

3GPP TS 38.300 V15.6.0 "3rd Generation Partnership Project; Technical Specification Group Radio Access Network; NR; NR and NG-RAN Overall Description; Stage 2 (Release 15)," Jun. 2019, 99 pages.
3GPP TS 23.503 V16.1.0 "3rd Generation Partnership Project; Technical Specification Group Services and System Aspects; Policy and Charging Control Framework for the 5G System; Stage 2 (Release 16)," Jun. 2019, 98 pages.
Huawei, et al., "QoS Handling for V2X Communication Over Uu Ref," 3GPP TSG-SA2 Meeting #134, Sapporo, Japan, Jun. 24-28, 2019, S2-1907425, 3 pages.
3GPP TS 38.413 V15.4.0 "3rd Generation Partnership Project; Technical Specification Group Radio Access Network; NG-RAN; NG Application Protocol (NGAP) (Release 15)," Jul. 2019, 328 pages.
3GPP TR 23.705 V13.0.0, "3rd Generation Partnership Project; Technical Specification Group Services and System Aspects; Study on system enhancements for user plane congestion management (Release 13)," Dec. 2014, 61 pages.
Huawei, et al., "QoS Handling for V2X Communication Over Uu Reference Point," SA WG2 Meeting #134, SA WG2 Meeting #134, S2-1907426, 3 pages.
3GPP TS 38.423 V15.4.0 "3rd Generation Partnership Project; Technical Specification Group Radio Access Network; NG-RAN; Xn application protocol (XnAP) (Release 15)," Jul. 2019, 309 pages.
RAN WG3, "Reply LS on QoS Support for eV2X over Uu interface," SA WG2 Meeting #S2-133, May 13-17, 2019, Reno, Nevada, USA, S2-1904893, 1 page.
Ericsson, et al., "Enhancements to QoS Handling for V2X Communication Over Uu Reference Point," 3GPP TSG SA WG2 Meeting #134, Sapporo, Japan, Jun. 24-28, 2019, S2-1908223, 3 pages.
Vodafone, "KI #7: automatic GBR QoS restoration at flow setup and handover using V2X Alternative QoS Profile with best effort 5QI," SA WG2 Meeting #134, Jun. 24-28, 2019, Sapporo, Japan, S2-1908287, 3 pages.
Huawei, et al., "QoS Handling for V2X Communication Over Uu Reference Point," 3GPP TSG-SA2 Meeting #134, Sapporo, Japan, Jun. 24-28, 2019, S2-1908225, 21 pages.
Huawei, et al., QoS Handling for V2X Communication Over Uu Reference Point. SA WG2 Meeting #134, Sapporo, Japan, 2019, S2-1908594, 1 page.
Ericsson, et al., "Enhancements to QoS Handling for V2X Communication Over Uu Reference Point," 3GPP TSG SA WG2 Meeting #134, Sapporo, Japan, Jun. 24-28, 2019 , S2-1908607, 11 pages.

* cited by examiner

| IE/Group Name | Presence | Range | IE type and reference |
|---|---|---|---|
| PDU Session Resources To Be Setup List | | 1 | |
| >PDU Session Resources To Be Setup Item | | 1 .. <maxnoof PDU sessions> | |
| >>PDU Session ID | M | | 9.2.3.18 |
| >>S-NSSAI | M | | 9.2.3.21 |
| >>QoS Flows To Be Setup List | | 1 | |
| >>>QoS Flows To Be Setup Item | | 1 .. <maxnoofQoS Flows> | |
| >>>>QoS Flow Identifier | M | | 9.2.3.10 |
| >>>>QoS Flow Level QoS Parameters (Active and Alternative GBR QoS Flow Information) | M | | 9.2.3.5 |
| >>>>E-RAB ID | O | | INTEGER (0..15, ...) |
| >>Data Forwarding and Offloading Info from source NG-RAN node | O | | 9.2.1.17 |

FIG. 3

9.3.4.8  Path Switch Request Transfer

This IE is transparent to the AMF.

| IE/Group Name | Presence | Range | IE type and reference | Semantics description |
|---|---|---|---|---|
| DL NG-U UP TNL Information | M | | UP Transport Layer Information 9.3.2.2 9.3.1.60 | NG-RAN node endpoint of the NG-U transport bearer, for delivery of DL PDUs. |
| User Plane Security Information | O | | | |
| QoS Flow Accepted List | | | | |
| >QoS Flow Accepted Item | | 1 .. <maxnoofQoSFlows> | | |
| >>QoS Flow Indicator | M | | 9.3.1.51 | |
| >> alternative QoS Parameters index | O | 1 .. <maxnoofQoSProfiles> | | |
| QoS Flow Failed to Setup List | O | | QoS Flow List 9.3.1.13 | |

9.3.1.13  QoS Flow List

This IE contains a list of QoS flows with a cause value. It is used for example to indicate failed QoS flow(s) or QoS flow(s) to be released.

| IE/Group Name | Presence | Range | IE type and reference | Semantics description |
|---|---|---|---|---|
| QoS Flow Item | | 1 .. <maxnoofQoSFlows> | | |
| >QoS Flow Indicator | M | | 9.3.1.51 | |
| >Cause | M | | 9.3.1.2 | |
| > alternative achievable QoS Parameters index | O | 1 .. <maxnoofQoSProfiles> | | |

FIG. 6

9.3.4.11 Handover Request Acknowledge Transfer

This IE is transparent to the AMF.

| IE/Group Name | Presence | Range | IE type and reference | Semantics description |
|---|---|---|---|---|
| DL NG-U UP TNL Information | M | | UP Transport Layer Information 9.3.2.2 | NG-RAN node endpoint of the NG-U transport bearer, for delivery of DL PDUs |
| DL Forwarding UP TNL Information | O | | UP Transport Layer Information 9.3.2.2 9.3.1.15 | To deliver forwarded DL PDUs |
| Security Result | O | | 9.3.1.15 | |
| QoS Flow Setup Response List | M | | | |
| >QoS Flow Setup Response Item | | 1..<maxnoofQoSFlows> | 9.3.1.31 | |
| >>QoS Flow Indicator Accepted | M | | | |
| QoS Flow Failed to Setup List | O | | QoS Flow List 9.3.1.13 | |
| Data Forwarding Response DRB List | O | | 9.3.1.77 | |

9.3.1.13 QoS Flow List

This IE contains a list of QoS flows with a cause value. It is used for example to indicate failed QoS flow(s) or QoS flow(s) to be released.

| IE/Group Name | Presence | Range | IE type and reference | Semantics description |
|---|---|---|---|---|
| QoS Flow Item | M | 1..<maxnoofQoSFlows> | | |
| >QoS Flow Indicator | M | | 9.3.1.51 | |
| >Cause | M | | 9.3.1.2 | |
| >xxxxxxxxxxxx QoS Parameters index | O | | | |

FIG. 8

DEVICES AND METHODS FOR SUPPORTING HANDOVER OF UE

CROSS-REFERENCE TO RELATED APPLICATIONS

This is a continuation of International Patent Application No. PCT/EP2019/071882, filed on Aug. 14, 2019, the disclosure of which is hereby incorporated by reference in its entirety.

TECHNICAL FIELD

The present disclosure relates generally to handover (HO) of a user equipment (UE) in a $5^{th}$ generation (5G) network. The disclosure more specifically relates to HO of a UE, which consumes a quality of service (QoS) flow that is associated with multiple QoS profiles. The disclosure proposes a network entity for supporting HO of the UE, and proposes a second network entity that is the target of HO of the UE. The disclosure also proposes corresponding methods for supporting HO of the UE.

BACKGROUND

A multi-level QoS concept has been introduced in Technical Report (TR) 23.786 FS_enhanced vehicle-to-everything (eV2X) as solution #27, and allows the usage of alternative QoS profiles in case a desired QoS profile cannot be fulfilled for a certain QoS flow. Each QoS profile is associated with a level of QoS, i.e., a QoS level.

In a 5G system (5GS), an application function (AF) may provide "Alternative Service Requirement(s)", in addition to the "Requested Service Requirement", to a policy control function (PCF). If notification control is enabled, the PCF may include "Alternative QoS parameter set(s)" based on the "Alternative Service Requirement(s)" in the policy and charging control (PCC) rule sent to a session management function (SMF). If notification control is enabled, the SMF may derive "Alternative QoS profile(s)" based on the "Alternative QoS parameter set(s)", and send them to the Next Generation radio access network (NG-RAN). When the access network (AN) notifies the 5G Core Network (5GC) that certain QoS characteristics cannot be fulfilled, it may include an alternative QoS profile, which can be supported, in the notification.

However, mobility support for multi-level QoS profiles is not discussed. It would be quite useful, if a target network entity in a HO case, e.g., a target gNodeB (gNB), could accept a HO request using alternative QoS profile(s), although the current QoS profile cannot be fulfilled.

For such mobility support, issues to be solved include the following:
How to transfer alternative QoS profiles during UE mobility (i.e., how to communicate the alternative QoS profiles in e.g., N2-based HO or Xn-based HO).
How to perform HO with the support of multiple QoS profiles.
How to notify the 5GC on the supported QoS profiles during the HO.

All the above issues should furthermore consider heterogeneous NG-RAN deployment, wherein some of the NG-RAN nodes may support multiple QoS profiles, while some of them do not.

A conventional approach focuses on a method to enhance the AF capabilities to monitor and influence QoS, and to enable the 5GS to operate with multiple QoS profiles based on AF input. The disclosed method allows the AF to indicate multiple (e.g., two or potentially more) QoS requirements (further converted by PCF into multiple QoS profiles), which are regarded as suitable to support a related application, and to be timely notified when the QoS profile is changed, or when the suitable QoS profiles cannot be any longer supported. However, the approach does not tackle the issue of multiple QoS profile support during the UE mobility (e.g., during a HO procedure).

Accordingly, a HO request message, as shown in FIG. 13, which is sent from a source NG-RAN node to a target NG-RAN node, during a UE HO preparation phase, is conventionally based only on one QoS Profile, and there is no support of multiple QoS profiles. Also, no explicit notification on the supported QoS profile, in case of a rejected QoS flow, occurs from the NG-RAN to the 5GC.

Another conventional approach focusses on methods for a mobile device (e.g., a vehicle), or an application server, for negotiating QoS with a network entity. A list of QoS classes (similar to QoS profiles) is sent during the establishment of a connection, or a new bearer establishment. In an embodiment, during the HO, a list of QoS classes is sent from the source to the target NG-RAN node. However, it is not clear from this approach, how multiple QoS profiles could be communicated between the NG-RAN nodes, in particular considering a heterogeneous deployment of 5G RAN. Heterogeneous RAN deployment refers to the case, in which one of the source or target NG-RAN nodes does not support multiple QoS profiles (e.g., only supports one QoS profile) or only some of the NG-RAN nodes support multiple QoS profiles in one area.

In addition, admission control is one important step in a HO procedure, wherein the target NG-RAN node performs admission control according to the QoS requirement of the QoS flows in a handed over protocol data unit (PDU) session. In $3^{rd}$ Generation Partnership Project (3GPP) Release 15 (Rel. 15), the admission control of a QoS flow at one RAN node is based on one QoS profile, which is the requested QoS profile. However, there is no support for multiple QoS profiles.

SA2 proposed one approach, which uses a multi-QoS profile concept in the UE mobility case. In this approach, when the target NG-RAN node does not have enough resources to support the desired QoS profile of a QoS flow, which is handed over from the source NG-RAN node, it tries to admit one of the alternative QoS profiles, and notifies the admitted QoS profile to the 5GC. The 5GC then adjusts the QoS profile of that QoS flow according to the admitted QoS profile. However, the approach does not support a heterogeneous RAN deployment.

SUMMARY

In Rel. 15, the admission control of a QoS flow at one RAN node is based on one QoS profile, which is the requested QoS profile. However, there is no support for multiple QoS profiles. The RAN node will not notify the 5GC explicitly on the supported QoS profile either, in case of a rejected QoS flow. Admission control is a radio resource management technique that that controls the admittance of a new QoS flow, to prevent network congestion and ensure the QoS of admitted service flows (e.g., during new bearer establishment, handover, etc.).

Some methods are provided about how exactly the 5GC can get the notification from RAN on the supported QoS profile. It does especially not consider a heterogeneous RAN deployment, nor does it provide any detailed design in case of Xn-based/NG-based HO, or successful/unsuccessful HO scenarios.

The current RAN specification is not able to provide such notification to the 5GC during UE mobility. In the case of a failure of a HO, due to lack of resources, there is no indication from the NG-RAN to the 5GC on an alternative QoS profile, either in an Xn-based HO (e.g., based on a path switch request message, as shown in FIG. 14), or in an N2-based HO (e.g., based on a handover request acknowledgement (ACK) transfer message, as shown in step 10 of FIG. 7).

In view of the above-mentioned problems and disadvantages, embodiments of the present disclosure aim to improve the conventional implementations and approaches. An objective is to provide a solution for support of multiple QoS profiles during UE mobility. In particular, the solution should be compatible with Xn-based and N2-based HO. The solution should further address the issue, how to communicate alternative QoS profiles in either HO case. The solution should also be applicable in the case of a heterogeneous RAN deployment. The solution should additionally address the issue, how to notify the 5GC on the supported QoS profile(s) during HO.

A solution to the above objective is provided by embodiments of the disclosure as described in the enclosed independent claims. Advantageous implementations of those embodiments of the disclosure are further defined in the dependent claims.

In particular, the embodiments of the disclosure propose devices and signaling enhancements for supporting multiple QoS profiles during UE mobility, e.g., especially when considering heterogeneous RAN deployment. The embodiments thus enable service continuity in a big area, during HO, due to a smooth QoS degradation. Hence, safety and efficiency may be provided for time critical applications (e.g., V2X use cases).

A first aspect of the disclosure provides a network entity for supporting HO of a UE from a first network entity to a second network entity, the network entity being configured to: obtain multiple QoS profiles associated with a QoS flow; obtain QoS capability information indicating whether the second network entity supports more than one QoS profile and/or whether the first network entity supports more than one QoS profile' and provide at least one message to the second network entity, wherein the at least one message includes at least one QoS profile according to the QoS capability information.

The first network entity may notify the second network entity about whether the first network entity supports more than one QoS profiles. The second network entity may notify the first network entity about whether the second network entity supports more than one QoS profiles. That is, the first network entity and the second network entity may notify each other the QoS capability information. They can notify each other directly or via the core network (e.g., AMF or SMF).

The network entity may be the first network entity, which may be a source NG-RAN, e.g., in the case of an Xn-based HO or in the case of FIG. 4 or FIG. 5. The second network entity may be a target NG-RAN. The network entity may also be an SMF, e.g., in the case of N2-based HO.

The QoS flow is, in particular, a QoS flow of a PDU session related to an application or service consumed by the UE. A "session" may comprise an association between a UE and a data network (DN) through a mobile network system that provides connectivity, e.g., the ability to exchange data between the UE and the DN. An "application" may comprise software entities and/or computer programs installed and executed on the UE and/or on application servers of the DN used to provide services to an end user device. A "service" may comprise a combination of actions and/or tasks performed jointly by the UE and/or the DN and/or the mobile network system, and/or applications to supply utilities or to aid an end user device, e.g., remote driving, vehicle platooning, assisted driving, etc.

Each QoS profile of the multiple QoS profiles may be related to a QoS level. In particular, the multiple QoS profiles may be used for implementing different levels of QoS. Thus, a single QoS flow can support multiple QoS levels. The QoS profiles of the QoS flow can be switched, in order to change the QoS level. If a group of QoS flows is established, each QoS flow of the group may be associated with one QoS profile for implementing a determined QoS level. In other words, a single QoS flow of the group may support a single QoS level. QoS flows related to different QoS profiles can be switched, in order to change the QoS level.

QoS profile may refer to one or more parameters of QoS or the set of them. For example, QoS parameter set(s).

The network entity of the first aspect provides a solution for supporting multiple QoS profiles during UE mobility, e.g., during HO of the UE, because it is able to provide the at least one message (e.g., a HO request message, or a session modification message) based on at least one QoS profile according to the QoS capability information, e.g., depending on whether one or more QoS profiles are supported by the first network entity or the second network entity, respectively.

In particular, the network entity of the first aspect is usable for both Xn-based and N2-based HO. The network entity of the first aspect is also usable in the case of heterogeneous RAN deployment, e.g., if only one of the first network entity and the second network entity supports more than one QoS profile.

In an implementation form of the first aspect, the multiple QoS profiles include an active QoS profile, and at least one alternative QoS profile and/or a preferred QoS profile.

The alternative QoS profile(s) can be optionally provided for a guaranteed bit rate (GBR) QoS flow with notification control enabled. If the corresponding PCC rule contains the related information (as described in Technical Specification (TS) 23.503), the SMF shall provide, in addition to the QoS profile, the alternative QoS profile(s) to the NG-RAN. An alternative QoS profile represents a combination of QoS parameters and has the same format as the QoS profile for that QoS flow. When the NG-RAN sends a notification to the SMF that the QoS profile cannot be guaranteed, the NG-RAN may include the reference to the alternative QoS profile(s) (as specified in clause 5.7.2.4) to indicate the QoS that the NG-RAN can guarantee.

The preferred QoS profile may be an original QoS profile as received from the SMF, which maps to the original requested QoS parameter sets from the PCF and the original requested service requirement from the AF. The alternative QoS profile may be as received from the SMF, which maps to the alternative QoS parameters set(s) from the PCF and alternative service requirement(s) from the AF. One or more alternative QoS profiles may be considered in case that the preferred/original QoS profile cannot be fulfilled. The active QoS profile may be the QoS profile used by RAN for the QoS flow.

In an implementation form of the first aspect, the network entity is configured to: obtain the QoS capability information of the first network entity and/or second network entity via receiving a message or notification, which includes an indication that the first network entity and/or second network entity supports more than one QoS profile, or via operations, administration, and maintenance (OAM) configuration.

In an implementation form of the first aspect, the network entity, being in particular the first network entity, is configured to, if the first network entity supports more than one QoS profile and the second network entity does not support more than one QoS profile (or support only one QoS profile): provide multiple request messages to the second network entity, wherein each request message includes one of the multiple QoS profiles.

In an implementation form of the first aspect, the network entity is further configured to: receive at least one acknowledge message from the second network entity, wherein each acknowledge message is responsive to one of the request messages and includes the respective QoS profile included in that request message; select a QoS profile from the at least one QoS profile included in the at least one acknowledge message; and support HO of the UE to the second network entity based on the selected QoS profile.

"Support HO of the UE" may mean, in particular, that the first network entity, e.g., a source gNB, sends the selected QoS profile in the HO command to the UE. Then, the first network entity may send one or more HO cancel message to the second network entity, with respect to the non-selected QoS profile(s) (TS 38.423).

Thus, support for multiple QoS profiles during UE mobility is provided, even if the second network entity supports only one QoS profile, i.e., even in a heterogeneous RAN deployment.

This implementation form is in particular beneficial, if the network entity, which may be the first network entity, knows that the second network entity supports more than one QoS profile (or not). The implementation form is beneficial for Xn-based HO. Each request message may be a HO request message.

In an implementation form of the first aspect, the network entity is further configured to inform a core network entity about the selected QoS profile.

Thus, the network entity further provides a solution to the issuer, how to notify the 5GC on the supported QoS profile(s) during the HO.

In an implementation form of the first aspect, the network entity, being in particular the first network entity, is configured to, if the first network entity supports more than one QoS profile and the second network entity does not support more than one QoS profile: provide a request message including the multiple QoS profiles to the second network entity; receive an acknowledge message from the second network entity, wherein the acknowledge message is for the active QoS profile among the multiple QoS profiles; and support HO of the UE to the second network entity based on the active QoS profile.

This implementation form is in particular beneficial, if the network entity does not know whether the second network entity supports more than one QoS profile or not. This implementation form is beneficial for Xn-based HO. The request message may be a HO request message.

In an implementation form of the first aspect, the network entity is further configured to inform a core network entity about the active QoS profile (or the active QoS profile is the selected QoS profile).

Thus, the network entity further provides a solution to the issue, how to notify the 5GC on the supported QoS profile(s) during the HO.

In an implementation for of the first aspect, the network entity, being in particular the first network entity or a SMF, is configured to, if the first network entity supports more than one QoS profile and the second network entity does not support more than one QoS profile: select a QoS profile from the multiple QoS profiles; and provide a request message to the second network entity, wherein the request message includes the selected QoS profile.

This implementation form is usable if the network entity knows whether the second network entity supports more than one QoS profile or not. The request message may be a HO request message.

In an implementation form of the first aspect, the network entity, being in particular a SMF, is configured to, if the first network entity does not support more than one QoS profile and the second network entity supports more than one QoS profile: provide a request message including the active QoS profile and the other QoS profiles of the multiple QoS profiles to the second network entity. The first network entity can notify the second network entity of all the multiple QoS profiles and indicate which is the active QoS profile.

Thus, support of multiple QoS profiles during UE mobility is provided, even if the first network entity supports only one QoS profile, e.g., in a heterogeneous RAN deployment. This implementation form is beneficial for N2-based HO.

In an implementation form of the first aspect, the network entity is further configured to: receive an acknowledge message including one of the multiple QoS profiles from the second network entity; and continue HO of the UE to the second network entity based on the QoS profile included in the acknowledge message.

This implementation form is in particular beneficial for N2-based HO.

In an implementation form of the first aspect, the network entity, being in particular a SMF, is configured to, if the first network entity does not support more than one QoS profile and the second network entity supports more than one QoS profile: provide, after completion of HO of the UE to the second network entity, a session modification message including the multiple QoS profiles to the second network entity.

This implementation form is in particular beneficial for Xn-based HO.

In an implementation form of the first aspect, the network entity, being in particular the first network entity, is configured to, if the first network entity and the second network entity support more than one QoS profile: provide a request message including the multiple QoS profiles to the second network entity; receive an acknowledge message including one of the multiple QoS profiles from the second network entity; and support HO of the UE to the second network entity based on the QoS profile included in the acknowledge message.

Thus, support of multiple QoS profiles during UE mobility is provided, and even QoS level (profile) upgrade or downgrade is enabled.

A second aspect of the disclosure provides a second network entity for supporting HO of a UE from a first network entity, the second network entity being configured to: receive, from the first network entity or from another network entity, a message including multiple QoS profiles associated with a QoS flow; select one of the multiple QoS profiles; and send a response message including the selected QoS profile to the first network entity or to the other network entity.

The message may be a request message for Xn-based HO and N2-based HO. The response message to the first network entity may be bridged by the SMF in case of an N2-based HO.

The second network entity of the second aspect provides a solution for multi-QoS profile support during UE mobility, i.e., during the HO, because it is able to select a QoS profile and send back an according response message based on the selected QoS profile. The second network entity mays select an active QoS profile, or may select an alternative QoS profile from the message. The second network entity may also select an original QoS profile. This depends of course on what QoS profiles/QoS levels are supported by the second network entity. However, QoS level upgrade and/or downgrade are supported.

In an implementation form of the second aspect, the second network entity is further configured to inform a core network, in particular an SMF, about the QoS profile included in the response message.

Thus, the second network entity provides a solution to the issue, how to notify the 5GC on the supported QoS profile(s) during the HO.

In an implementation form of the second aspect, the second network entity is configured to inform the core network, in particular the SMF, about the QoS profile included in the response message after the selection of one of the multiple QoS profiles and/or after the HO execution.

In an implementation form of the second aspect, the second network entity is configured to inform the core network, in particular the SMF, about the QoS profile included in the response message using a new message or by reusing an existing message.

The existing message can be the response message (e.g., a HO ACK) or a path switching message.

In an implementation form of the second aspect, the second network entity is configured to select as the one of the multiple QoS profiles: an active QoS profile, if the active QoS profile is supported by the second network entity; a lower QoS profile than the active QoS profile, if the active QoS profile is not supported by the second network entity.

Thus, QoS profile/QoS level downgrade during UE mobility is supported.

In an implementation form of the second aspect, the second network entity is further configured to select as the one of the multiple QoS profiles: a higher QoS profile than the active QoS profile, if the active QoS profile and the higher QoS profile are supported by the second network entity.

Thus, QoS profile/QoS level upgrade during UE mobility is supported.

A third aspect of the disclosure provides a method for supporting HO of a UE from a first network entity to a second network entity, the method comprising: obtaining multiple QoS profiles associated with a QoS flow; obtaining QoS capability information indicating whether the second network entity supports more than one QoS profile and/or whether the first network entity supports more than one QoS profile; and providing at least one message to the second network entity, wherein the at least one message includes at least one QoS profile according to the QoS capability information.

In an implementation form of the third aspect, the multiple QoS profiles include an active QoS profile, and at least one alternative QoS profile and/or a preferred QoS profile.

In an implementation form of the third aspect, method comprises: obtaining the QoS capability information of the first network entity and/or the second network entity via receiving a message or notification, which includes an indication that the first network entity and/or second network entity supports more than one QoS profile, or via OAM configuration.

In an implementation form of the third aspect, the method, being in particular performed by the first network entity, comprises, if the first network entity supports more than one QoS profile and the second network entity does not support more than one QoS profile: providing multiple request messages to the second network entity, wherein each request message includes one of the multiple QoS profiles.

In an implementation form of the third aspect, method further comprises: receiving at least one acknowledge message from the second network entity, wherein each acknowledge message is responsive to one of the request messages and includes the respective QoS profile included in that request message; selecting a QoS profile from the at least one QoS profile included in the at least one acknowledge message; and supporting HO of the UE to the second network entity based on the selected QoS profile.

In an implementation form of the third aspect, the method further comprises informing a core network entity about the selected QoS profile.

In an implementation form of the third aspect, the method, being in particular performed by the first network entity, comprises, if the first network entity supports more than one QoS profile and the second network entity does not support more than one QoS profile: providing a request message including the multiple QoS profiles to the second network entity; receiving an acknowledge message from the second network entity, wherein the acknowledge message is for the active QoS profile among the multiple QoS profiles; and supporting HO of the UE to the second network entity based on the active QoS profile.

In an implementation form of the third aspect, the method further comprises informing a core network entity about the active QoS profile.

In an implementation for of the third aspect, the method, being in particular performed by the first network entity or a SMF, comprises, if the first network entity supports more than one QoS profile and the second network entity does not support more than one QoS profile: selecting a QoS profile from the multiple QoS profiles; and providing a request message to the second network entity, wherein the request message includes the selected QoS profile.

In an implementation form of the third aspect, the method, being in particular performed by a SMF, comprises, if the first network entity does not support more than one QoS profile and the second network entity supports more than one QoS profile: providing a request message including the active QoS profile and the other QoS profiles of the multiple QoS profiles to the second network entity.

In an implementation form of the third aspect, the method further comprises: receiving an acknowledge message including one of the multiple QoS profiles from the second network entity; and continuing HO of the UE to the second network entity based on the QoS profile included in the acknowledge message.

In an implementation form of the third aspect, the method, being in particular performed by a SMF, comprises, if the first network entity does not support more than one QoS profile and the second network entity supports more than one QoS profile: providing, after completion of HO of the UE to the second network entity, a session modification message including the multiple QoS profiles to the second network entity.

In an implementation form of the third aspect, the method, in particular being performed by the first network entity, comprises, if the first network entity and the second network entity support more than one QoS profile: providing a request message including the multiple QoS profiles to the second network entity; receiving an acknowledge message including one of the multiple QoS profiles from the second network entity; and supporting HO of the UE to the second network entity based on the QoS profile included in the acknowledge message.

The method of the third aspect and its implementation forms achieve the same advantages and effects as described above for the network entity of the first aspect and its respective implementation forms.

A fourth aspect of the disclosure provides a method for supporting HO of a UE from a first network entity to a second network entity, the method comprising: receiving, from the first network entity or from another network entity, a message including multiple QoS profiles associated with a QoS flow, selecting one of the multiple QoS profiles; and sending a response message including the selected QoS profile to the first network entity or to the other network entity.

In an implementation form of the fourth aspect, the method further comprises informing a core network, in particular an SMF, about the QoS profile included in the response message.

In an implementation form of the fourth aspect, the method comprises informing the core network, in particular the SMF, about the QoS profile included in the response message after the selection of one of the multiple QoS profiles and/or after the HO execution.

In an implementation form of the fourth aspect, the method comprises informing the core network, in particular the SMF, about the QoS profile included in the response message using a new message or by reusing an existing message.

In an implementation form of the fourth aspect, the method comprises selecting as the one of the multiple QoS profiles: an active QoS profile, if the active QoS profile is supported by the second network entity; a lower QoS profile than the active QoS profile, if the active QoS profile is not supported by the second network entity.

In an implementation form of the fourth aspect, the method further comprises selecting as the one of the multiple QoS profiles: a higher QoS profile than the active QoS profile, if the active QoS profile and the higher QoS profile are supported by the second network entity.

The method of the fourth aspect and its implementation forms achieve the same advantages and effects as described above for the second network entity of the second aspect and its respective implementation forms.

A fifth aspect of the disclosure provides a computer program which, when executed by a processor, causes the method of the third aspect or the fourth aspect or any of their respective implementation forms to be performed.

In summary, the embodiments of the disclosure provide a network entity (first aspect), which may perform a conversion between a multi-QoS profile (list of multiple QoS profiles) and a QoS profile according to the first and/or second network entity's QoS capability. The network entity may notify the 5GC about the supported QoS profile during UE mobility. The signaling enhancements mainly focus on the following steps during a HO procedure.

1. Transfer of multiple QoS profiles between first network entity and second network entity (e.g., source and target NG-RAN nodes), directly or via 5GC, in case of UE mobility (Xn-based/N2-based HO).

2. Notification of the admission control results to the 5GC (Xn-based/N2-based HO). Notification during the preparation phase and execution phase, and notification in case of a successful HO and failed HO, respectively.

An example would be the following, for an Xn-based HO.

1. The transfer of a multiple QoS profile(s) between the first network entity and second network entity uses Xn interface during the HO preparation phase. This may include a format adjustment according to the multiple QoS profile support of the first network entity and the second network entity.

2. Notification from the first or second network entity to the SMF on the QoS profile status after HO execution. For instance, the active QoS profile or supported alternative QoS profile(s).

3a. The SMF triggers a PDU session modification procedure to update the QoS profile of the PDU session.

3b. The PCF triggers a PDU session QoS policy update to the SMF, and the SMF triggers a PDU session modification procedure to update the QoS profile of the PDU session.

4. Go to step 1, if HO is triggered.

The embodiments of the disclosure thus propose how a multi-level QoS profile can be used by RAN in case of UE mobility. More specifically, how to transmit the alternative QoS profiles(s) between NG-RAN nodes (Xn-based HO) as well as how to communicate the alternative QoS profile(s) from 5GC to NG-RAN (N2-based HO) during UE mobility. Furthermore, the embodiments of the disclosure propose a notification of the achievable/active QoS profile from NG-RAN to 5GC during UE mobility.

The support of a multi-level QoS profile during UE mobility applies to the case with heterogeneous RAN deployment, which may include the following.

Neither the source NG-RAN node nor the target NG-RAN node supports multiple QoS profiles.

Both the source NG-RAN node and the target NG-RAN support multiple QoS profiles.

The source NG-RAN node supports multiple QoS profiles, but the target NG-RAN node does not.

The source NG-RAN node does not support multiple QoS profiles, but the target NG-RAN node does.

Finally, the embodiments of the disclosure introduce how multiple QoS profiles are treated at the RAN during UE mobility (i.e., only one QoS profile per flow before, how to differentiate and treat multiple QoS profile now). This includes the admission control using only the active or original QoS profile and multiple QoS profiles.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of embodiments, a functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings.

FIG. 3 shows an example of a message provided by a network entity according to an embodiment of the disclosure.

FIG. 6 shows an example of a message provided by a network entity according to an embodiment of the disclosure.

FIG. 8 shows an example of a message provided by a network entity according to an embodiment of the disclosure.

DETAILED DESCRIPTION OF EMBODIMENTS

Figure 1:
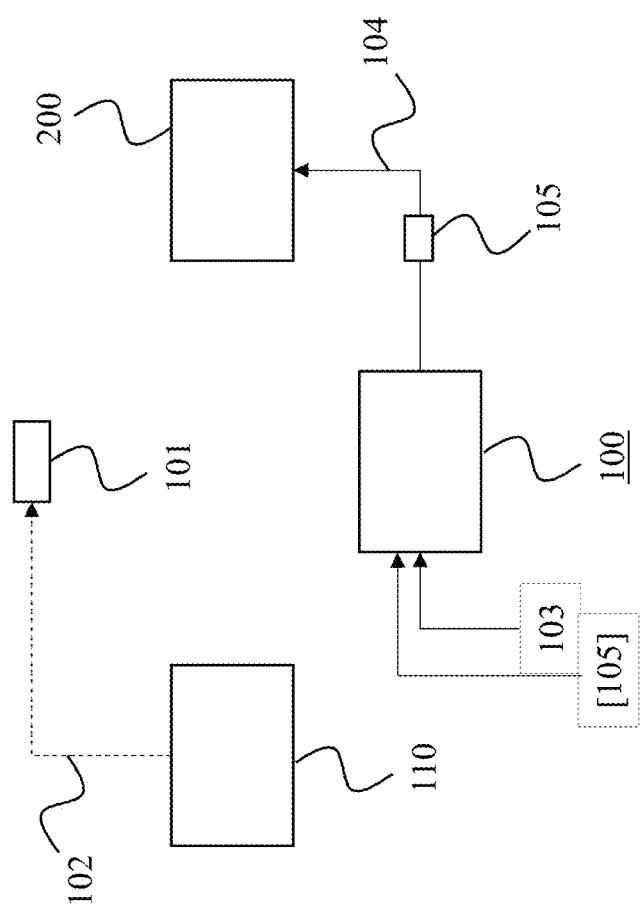
FIG. 1 shows a network entity according to an embodiment of the disclosure.

FIG. 1 shows a network entity 100 according to an embodiment of the disclosure. The network entity 100 is configured to support HO of a UE 101 from a first network entity 110 to a second network entity 200. The HO may be Xn-based or N2/NG-based. The network entity 100 may be, or may be included in, the first network entity 110. The first network entity 110 may be a source NG-RAN node, e.g., a source base station (BS) or source gNB. The second network entity 200 may be a target NG-RAN node, e.g., a target BS or target gNB. The UE 101 may be a mobile communication device, a mobile phone, a smartphone, a vehicle, or the like.

The network entity 100 may comprise processing circuitry (not shown) configured to perform, conduct or initiate the various operations of the network entity 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the network entity 100 to perform, conduct or initiate the operations or methods described herein.

The network entity 100 is configured to obtain multiple QoS profiles 105 (the group of QoS profiles being indicated by [105]) associated with a QoS flow 102. The QoS flow 102 may relate to an application or service that is consumed by the UE 101, e.g., a QoS flow, application or service that is provided to the UE 101 by the first network entity 110.

Further, the network entity 100 is configured to obtain QoS capability information 103 indicating whether the second network entity 200 supports more than one QoS profile 105 and/or whether the first network entity 110 supports more than one QoS profile 105. The network entity 100 may also obtain different QoS capability information, separately, related to the first network entity 110 and the second network entity 200, respectively.

The network entity 100 is further configured to provide at least one message 104, i.e., one message 104 or multiple messages 104, to the second network entity 200, wherein the one or more messages 104 include at least one QoS profile 105 according to the QoS capability information 103. That means, each of the one or more messages 104 may include at least one QoS profile 105. Whether a message 104 includes one or more QoS profiles 105 depends on the QoS capability information 103. How, based on the QoS capability information 103, the one or more QoS profiles 105 may be selected to be included in one or more messages 104, is explained below.

Figure 2:
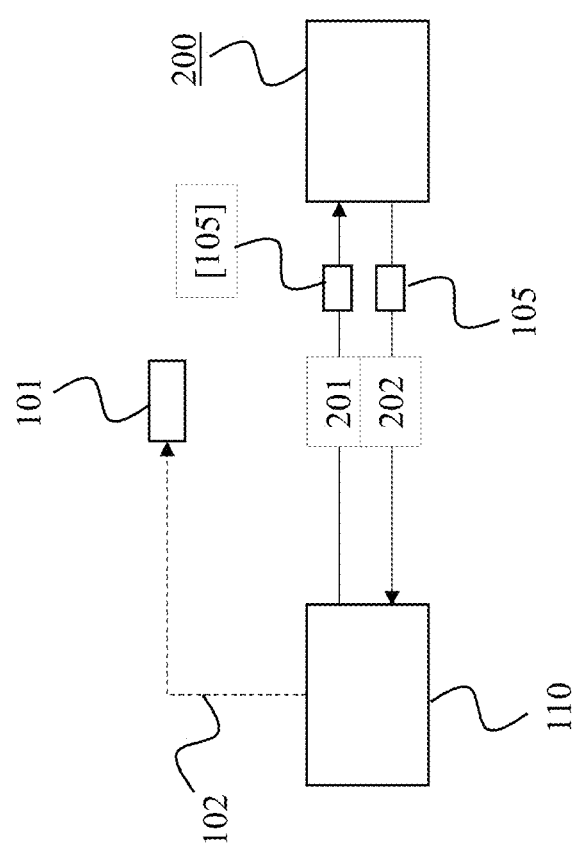
FIG. 2 shows a second network entity according to an embodiment of the disclosure.

FIG. 2 shows a second network entity 200 according to an embodiment of the disclosure. The second network entity 200 is configured to support HO of a UE 101 from a first network entity 110 to the second network entity 200, i.e., it is the HO receiving network entity. The HO may be the same as referred to in FIG. 1. Accordingly, the UE 101, the first network entity 110, and the second network entity 200 may be the ones illustrated in FIG. 1 and described above. Also, the QoS flow 102 and the QoS profiles 105 may be the same as illustrated in FIG. 1 and described above.

The second network entity 200 is configured to receive, from the first network entity 110 or from another network entity (the latter is not shown), a message 201 including multiple QoS profiles 105 (the group of QoS profiles being indicated by [105]) associated with a QoS flow 102. The message 201 may be the message 104 shown in FIG. 1, i.e., in the case where the message 104 includes more than one QoS profile.

The second network entity 200 is further configured to select one of the multiple QoS profiles 105 (i.e., select from those included in the message 201), and to send a response message 202 including the selected QoS profile 105 to the first network entity 110, or to the other network entity.

To facilitate further explanation of the multiple QoS profile 105 treatment supported by the network entities 100, 110, 200, according to embodiments of the disclosure, the following definitions are used in this document from the NG-RAN perspective.

Original QoS profile 105a: received from SMF, which maps to the original requested QoS parameter sets from the PCF and the original requested service requirement from the AF.

Alternative QoS profile(s) 105b: received from SMF, which maps to the alternative QoS parameters set(s) from the PCF and the alternative service requirement(s) from the AF. The alternative QoS profiles 105 are considered in case the original QoS profile cannot be fulfilled.

Active QoS profile 105*c*: the QoS profile used by the RAN for the QoS flow (102).

The active QoS profile 105*c* can be either the original QoS profile 105*a* or can be one of the alternative QoS profile(s) 105*b*. The active QoS profile 105*c*, the original QoS profile 105*a*, and the alternative QoS profile(s) 105*b* may together form the multiple QoS profiles 105. In other words, the multiple QoS profiles 105 may include an active QoS profile 105*c*, and at least one alternative QoS profile 105*b* and/or a preferred or original QoS profile 105*a*.

The active QoS profile 105*c* can be either selected by the SMF/PCF, as described in 3GPP TS 23.287 (current agreed solution #27), or NG-RAN as described in 3GPP TR 23.786 (solution #16 option 2). The original QoS profile 105*a* is the preferred QoS profile, e.g., the QoS profile with the highest priority according to the application requirements (highest rank), i.e., the QoS profile that is associated with the highest QoS level.

An example implementation of alternative QoS profiles 105*b* list conveyed from 5GC to the NG-RAN is as shown below.

| INDEX | QoS PROFILE | RANK/LEVEL/PRIORITY |
|---|---|---|
| 0 | requested QoS profile | 0 |
| 1 | alternative QoS profile | 1 ← active QoS profile |
| 2 | alternative QoS profile | 2 |
| N | alternative QoS profile | 1 |

In the following, transfer of multiple QoS profiles 105 between/within RAN on the one hand, and from to 5GC to RAN on the other hand, during UE mobility, is described.

For support of multiple QoS profiles 105 (multi-level QoS profile) in a heterogeneous RAN deployment, the network entity 100 is able to convert the multiple QoS profiles to the right format according to the QoS capability information 103 (e.g., being a target NG-RAN node capability). The network entity 100 may be used in the protocol data unit (PDU) session setup/modification procedure, as well as in the HO procedures.

Four cases have been considered for HO as follows.
Case 1: Both the first network entity 110 (e.g., a source NG-RAN node) and the second network entity 200 (e.g., a target NG-RAN node) do not support multiple QoS profiles 105.
Case 2: The first network entity 110 supports multiple QoS profiles, but the second network entity 200 does not
Case 3: the first network entity 110 does not support multiple QoS profiles 105, but the second network entity 200 does.
Case 4: Both the first network entity 110 and the second network entity 200 support multiple QoS profiles 105.

The network entity 100 can be provided at (or in) the first network entity 110 (e.g., Xn-based HO). The first network entity 110 may be aware of the capability for support of multiple QoS profiles 105 at the second network entity 200 (i.e., of the QoS capability information 103 related to the second network entity 200). The network entity 100 can also be at (or in) the SMF (e.g., N2-based/NG-based HO). The first network entity 110 may could further be not aware of the capability for support of multiple QoS profiles 105 at the second network entity 200. In this case, a PDU session establishment/modification is included.

In Case 1, the NG-RAN uses/sends the active QoS profile 105*c* for mobility related procedures.

In Case 2, the following distinctions may be made.
If the first network entity 110 knows that the second network entity 200 does not support more than one QoS profile 105 (e.g., via enhanced Automatic Neighbour Relation (ANR) or gNB capability exchange over Xn), for Xn-based HO, the network entity 100 (Note: the network entity 100 may here be the first network entity 110) can send multiple HO request messages (each a message 104 as shown in FIG. 1) to the second network entity 200. Each HO request message has one of the QoS profiles 105 in the list of multiple QoS profiles 105. The network entity 100 may further receive multiple HO ACKs (acknowledge messages) from the second network entity 200. The network entity 100 may continue with the HO execution procedure using the most desired QoS profile 105 in the HO ACK, and may cancel the other HO procedures triggered by the multiple HO request messages.
If the first network entity 110 knows that the second network entity 200 does not support more than one QoS profile 105, alternatively, for Xn-based HO, the network entity 100 can send only one selected QoS profile 105 to the second network entity 200 (e.g., in a HO request message as the message 104). The selected QoS profile 105 can be the active QoS profile 105*c* or a desired QoS profile 105 (e.g., from alternative QoS profile(s) 105*b* and original QoS profile 105*a*).
If the first network entity 110 does not know, whether the second network entity 200 supports more than one QoS profile 105, the network entity 100 can alternatively, for Xn-based HO, send the complete (list of) QoS profiles 105 to the second network entity 200 (e.g., in a HO request message as the message 104). The second network entity 200 can ignore the (list of) the alternative QoS profiles 105*b*, and can use only the active QoS profile 105*c*.
For N2-based HO, if the network entity 100 knows whether the second network entity 200 supports more than one QoS profile 105, the network entity 100 (Note: the network entity 100 may here be the SMF) may include only one selected QoS profile 105 in the HO request message (as the message 104) from the first network entity 110 to the second network entity 200. Then, the second network entity 200 can use the selected QoS profile 105 for performing admission control.
For N2-based HO, if the network entity 100 does not know whether the second network entity 200 supports more than one QoS profile 105, the network entity 100 (Note: the network entity 100 may here be the SMF) may send the complete (list of) QoS profiles 105 to the second network entity 200 (e.g.). The second network entity 200 can ignore the (list of) alternative QoS profiles 105*b*, and can use only the active QoS profile 105*c*.

In Case 3, following distinctions may be made.
For N2-based HO, the first network entity 110 can send the active QoS profile 105*c* to the network entity 100 (Note: the network entity 100 may here be the SMF), and the network entity 100 changes it to a list of QoS profiles 105, and sends it to the second network entity 200 (e.g., via HO request message).
For Xn-based HO, the first network entity 110 can send the active QoS profile 105*c* in QoS flow to-be-setup list to the second network entity 200 (e.g., HO request message). After the completion of HO, the network entity 100 (Note: the network entity 100 may here be the SMF) may trigger session modification message to change the active QoS profile to a list of QoS profile(s) 105.

In Case 4, the network entity 100 can use/send the complete list of QoS profile(s) 105 for mobility related procedures, either Xn-based or N2-based.

FIG. 3 shows, in this respect, an exemplary implementation of the multiple QoS profiles 105 in the related UE context IE. The network entity 100 may be configured to add multiple QoS profiles (e.g., active/requested/supported) as part of QoS flow level QoS parameters in the HO request message, e.g., via a UE context information element (IE).

In the following, admission control and HO execution is described.

In Cases 3 and 4, the second network entity 200 supports more than one QoS profile 105. The second network entity 200 thus may perform admission control based on the multiple QoS profiles 105. There can be distinguished different options regarding the admission control process of the second network entity 200 based on multiple QoS profiles 105 as follows.

Option 1, downgrade only: The admission control of the second network entity 200 checks firstly the active QoS profile 105c of the first network entity 110, and if it is not supported, the admission control of the second network entity 200 checks only the downgrade case (e.g., checks for lower alternative QoS profile(s) 105b or the alternative QoS profile(s) which has/have lower priority than the active QoS profile).

Option 2, both downgrade and upgrade: The admission control of the second network entity 200 checks firstly the active QoS profile 105c of the first network entity 110, and if it is not supported, the admission control of the second network entity 200 checks the downgrade case (lower alternative QoS profile(s) 105b or the alternative QoS profile(s) which has/have lower priority than the active QoS profile). In addition, the admission control of the second network entity 200 also checks the QoS upgrade case (higher alternative QoS profile(s) 105b or the alternative QoS profile(s) which has/have higher priority than the active QoS profile), if the active QoS profile 105 can be supported.

In an alternative implementation, the second network entity 200 could also receive the original QoS profile 105a as the active QoS profile 105c. Then only Option 1 as described above applies.

Figure 4:
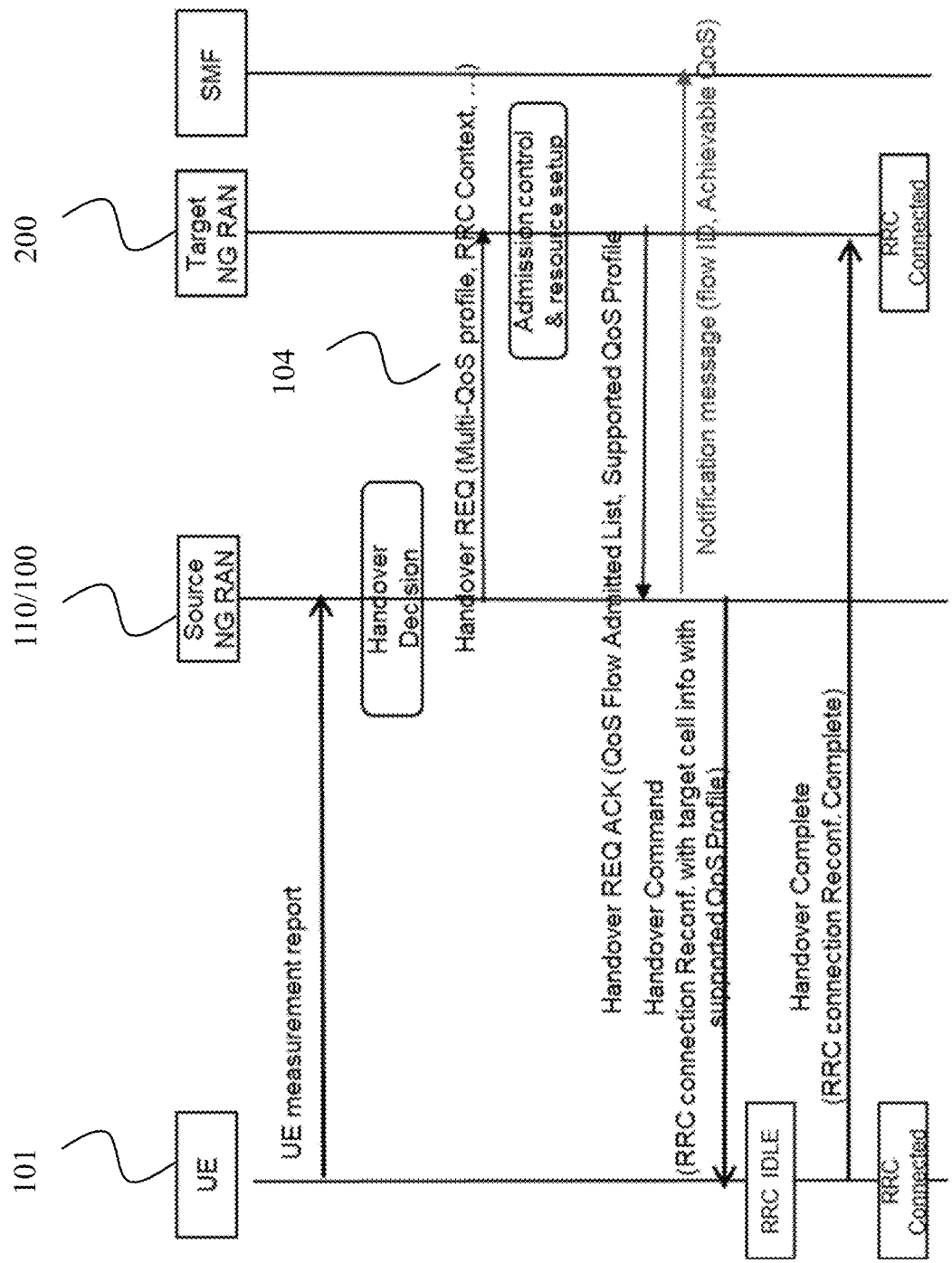
FIG. 4 shows an example message sequence for an Xn-based HO, as performed by network entities according to embodiments of the disclosure.

FIG. 4 shows an example of a message sequence chart for Xn-based handover in Case 4, in which both the first network entity 110 and the second network entity 200 support multiple QoS profiles 105. During HO of the UE 101 from the first network entity 110 to the second network entity 200 ("before" the successful execution of the HO), the network entity 100 (here it is exemplarily the first network entity 110) sends to the second network entity 200 a list of QoS profile(s) 105 (e.g., requested/active/alternative) in a HO request message as the message 104. The second network entity 200 performs the admission control, and then sends a notification (e.g., the HO ACK message) of the supported QoS profile 105 to the network entity 100.

In Case 2, the second network entity 200 does not support multiple QoS profiles. The second network entity 200 performs admission control on the selected QoS profile.

In the following, notification from RAN to the core network during HO procedure is described.

When there is a QoS downgrade/upgrade, due to a HO, an application running at the UE 101 can be notified using one of the following options.

Option a: the HO command that is sent from the first network entity 110 the UE 101 may include an indication (e.g., a flag) used by UE access stratum to notify the (e.g., V2X) application. Then UE communication layer (access stratum) may notify the (e.g., V2X) application, just after the radio resource control (RRC) reconfiguration message reception.

Option b: NG RAN may notify 5GC on the supported QoS profile 105. 5GC may notify the application server (or AF), and the application server notifies the application client at the UE 101.

The present disclosure focuses on the enhancement of Option b.

In Case 2, the second network entity 200 performs admission control based on selected QoS profile 105. In this case, the second network entity 200 does not support multiple QoS profiles 105.

The achievable QoS profile 105 can be included per multi_QoS profile QoS flow in N2 SM container in Nsmf_PDUsession_updateSMcontext_request, path switching message (Xn-based HO), and HO request acknowledge message (N2-based handover).

For the successful setup QoS flows 102: enable upgrade.
For the not successful setup QoS flows 102: enable downgrade.

In Case 3 or 4, the second network entity 200 may perform admission control based on the multiple QoS profiles 105.

The active QoS profile 105 can be included per multi_QoS profile QoS flow in N2 SM container in Nsmf_PDUsession_updateSMcontext_request, path switching message (Xn-based HO), and handover request acknowledge message (N2-based HO).

For the successful setup QoS flows 102: enable downgrade and upgrade.

In an implementation, the RAN to 5GC QoS notification can be enhanced to include the achievable/supported QoS profile 105 during the mobility procedure, such that 5GC/AF can take one or more corresponding actions at the SMF/PCF or AF.

In an implementation, the achievable QoS profile 105 can be included in a QoS flow setup failure message (e.g., in case of a downgrade) or a QoS flow setup successful message (e.g., in case of an upgrade).

Figure 5:
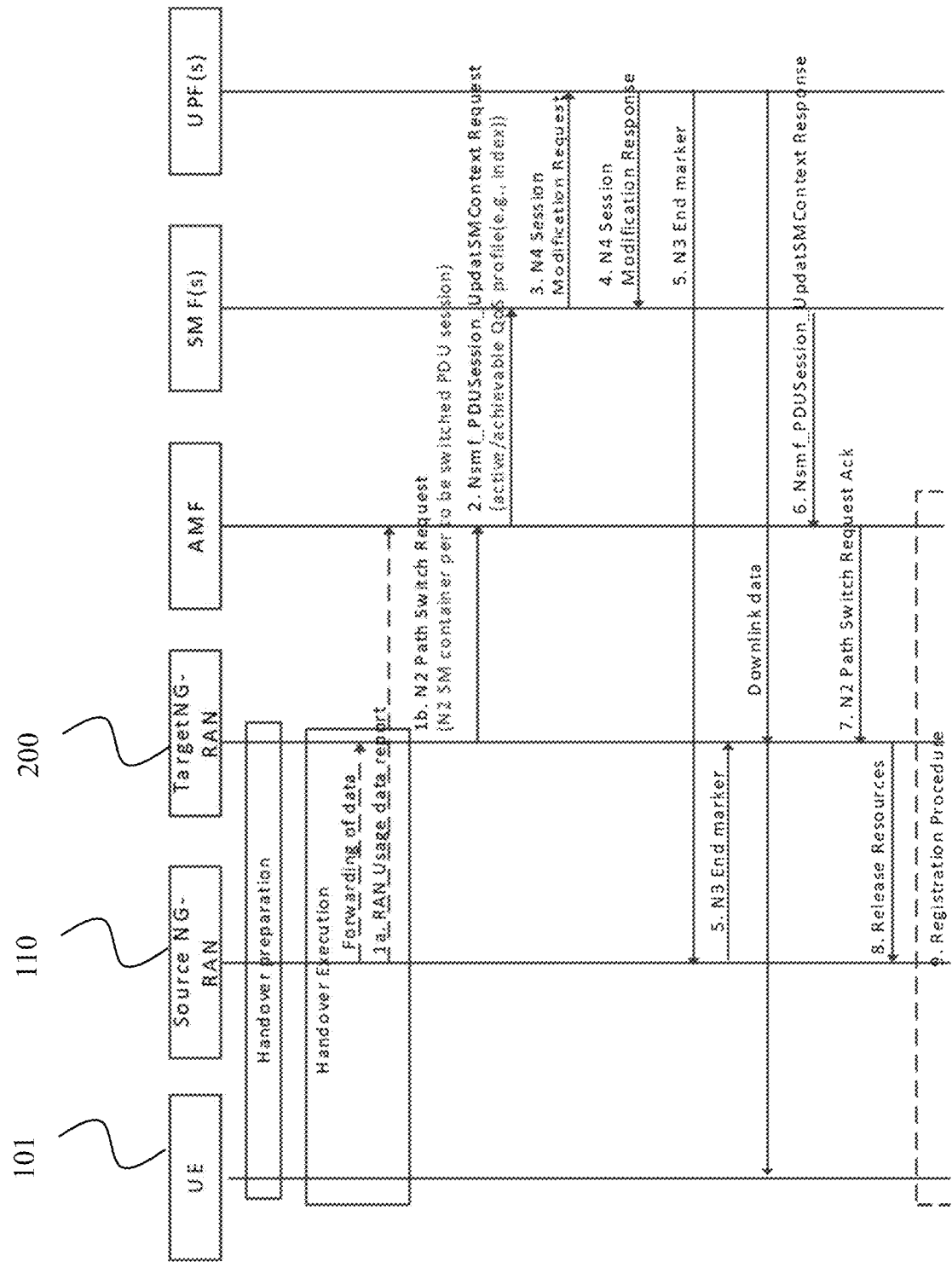
FIG. 5 shows an example message sequence for an Xn-based HO, as performed by network entities according to embodiments of the disclosure.

The notification can be sent to the 5GC either after the admission control (see e.g., FIG. 4) and/or after the execution of the HO (see e.g., FIG. 5).

Option 1 may be complemented with additional signaling with the information element of achievable QoS profile 105, QoS flow indication. Option 2 could reuse the existing signaling with an additional information element of achievable QoS profile 105.

In the following, some example implementations of the network entities 100, 110, 200 and of message sequences, according to embodiments of the disclosure, are shown.

FIG. 4 shows an example of a message sequence for an Xn-based HO for Option 1 in Case 4. After the admission control, the network entity 100 (here, exemplarily, the first network entity 110, e.g., a source NG-RAN node) sends an additional signal (i.e., notification message) to the SMF, in order to indicate the achievable QoS profile 105. This notification message may include the information on the QoS flow ID and also the achievable QoS of this QoS flow 102.

FIG. 5 shows an example of a message sequence for an Xn-based HO for Option 2 in Case 3 or 4, which includes the achievable "alternative QoS profile 105b" in the N2 path switching and PDU session update SM context message, after the successful execution of the HO. The path switch message should include the achievable QoS profile 105 for both the successful HO QoS flows 102 and failed to HO QoS flows 102, as shown in FIG. 6.

Figure 7:
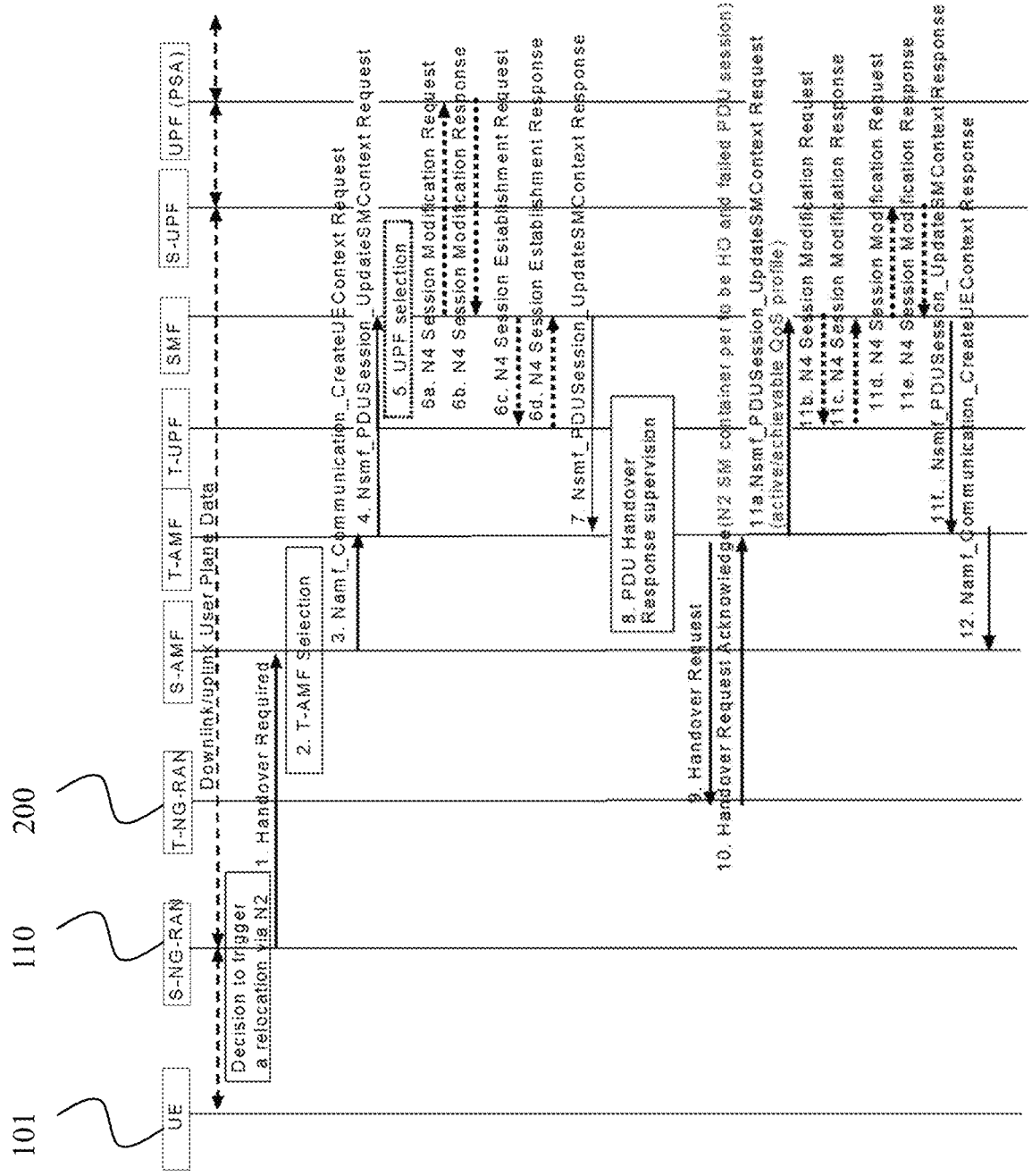
FIG. 7 shows an example of a message sequence for an N2-based HO, as performed by network entities according to embodiments of the disclosure.

FIG. 7 shows an example message sequence of an NG-based HO for Option 2, wherein the achievable QoS profile 105 is included in the HO request acknowledge and update SM context request after the successful execution of the HO. In the same, the HO request acknowledge message and update SM context request should include the achievable QoS profile 105 for both the successful established QoS flows 102 as well as the failed to be established QoS flows 102, as shown in FIG. 8.

In the following, details of obtaining the multi-QoS support capability of RAN nodes, i.e., the QoS capability information 103, are described.

Figure 9:
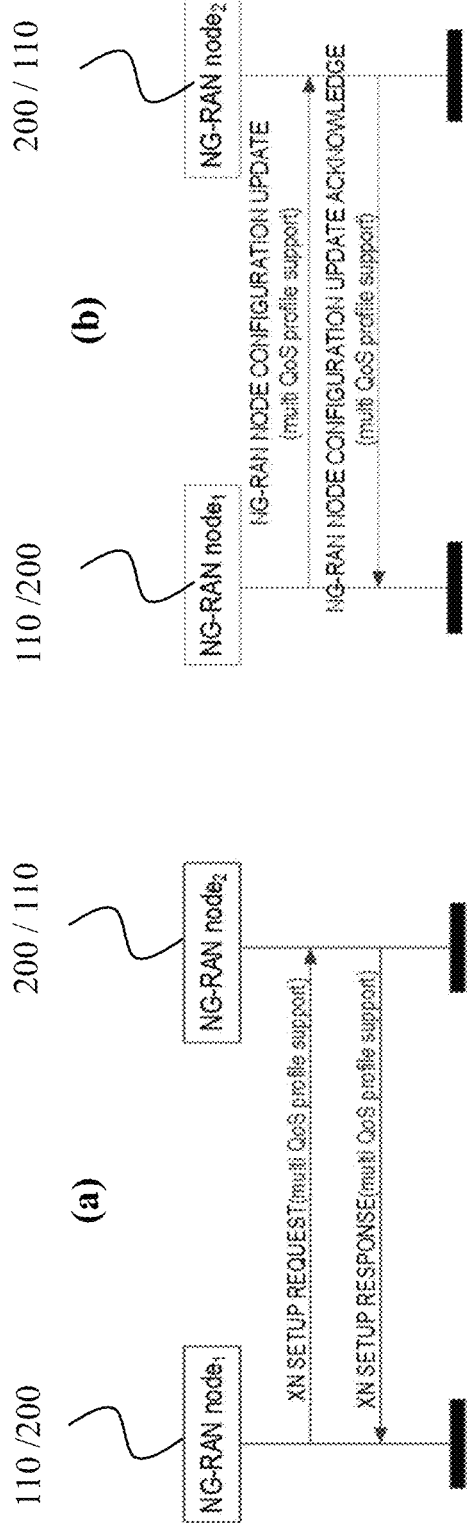
FIG. 9 shows an example of how QoS capability information can be obtained by a network entity according to an embodiment of the disclosure.
Figure 10:
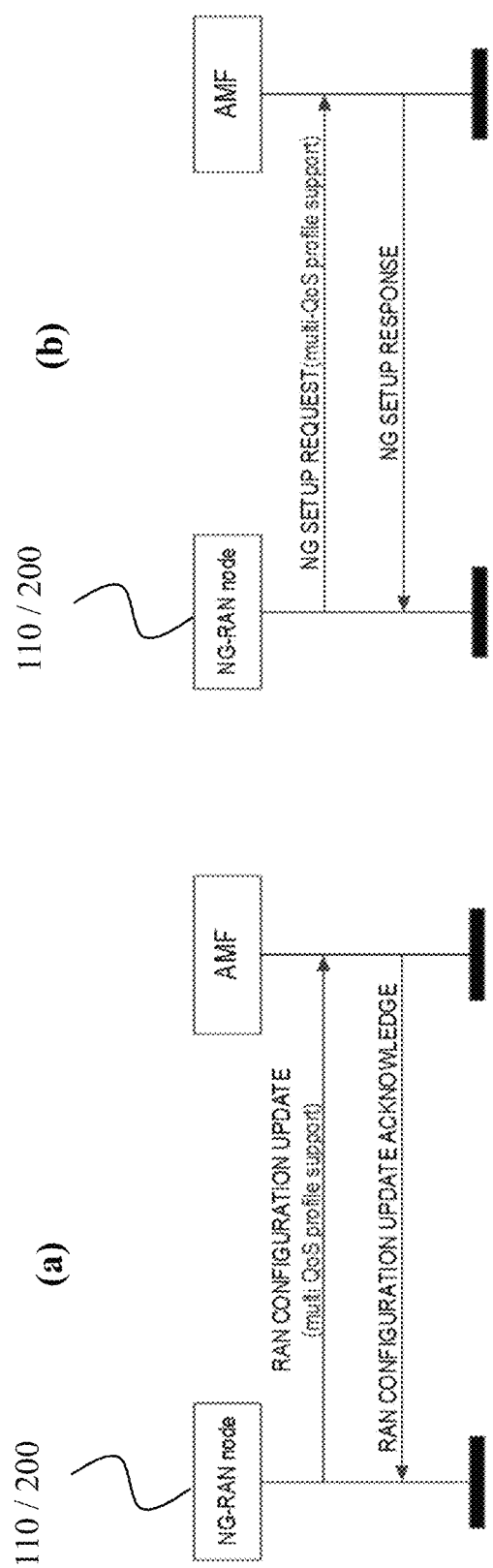
FIG. 10 shows an example of how QoS capability information can be obtained by a network entity according to an embodiment of the disclosure.

The QoS capability information 103 regarding the NG-RAN nodes (i.e., of the first network entity 110 and/or the second network entity 200) can be obtained via OAM configuration or an explicit message. The example in FIG. 9 shows that neighboring RAN nodes can exchange the QoS capability information 103 via an Xn setup message and a NG-RAN node configuration update message. In one example, an indication/flag of "Multi-QoS profile support" may be included in the Xn setup request/response message to show whether multiple QoS profiles 105 are supported or not. And this flag/indication can be updated using NG-RAN node configuration update and corresponding ACK/NACK message shown in FIG. 10.

Figure 11:
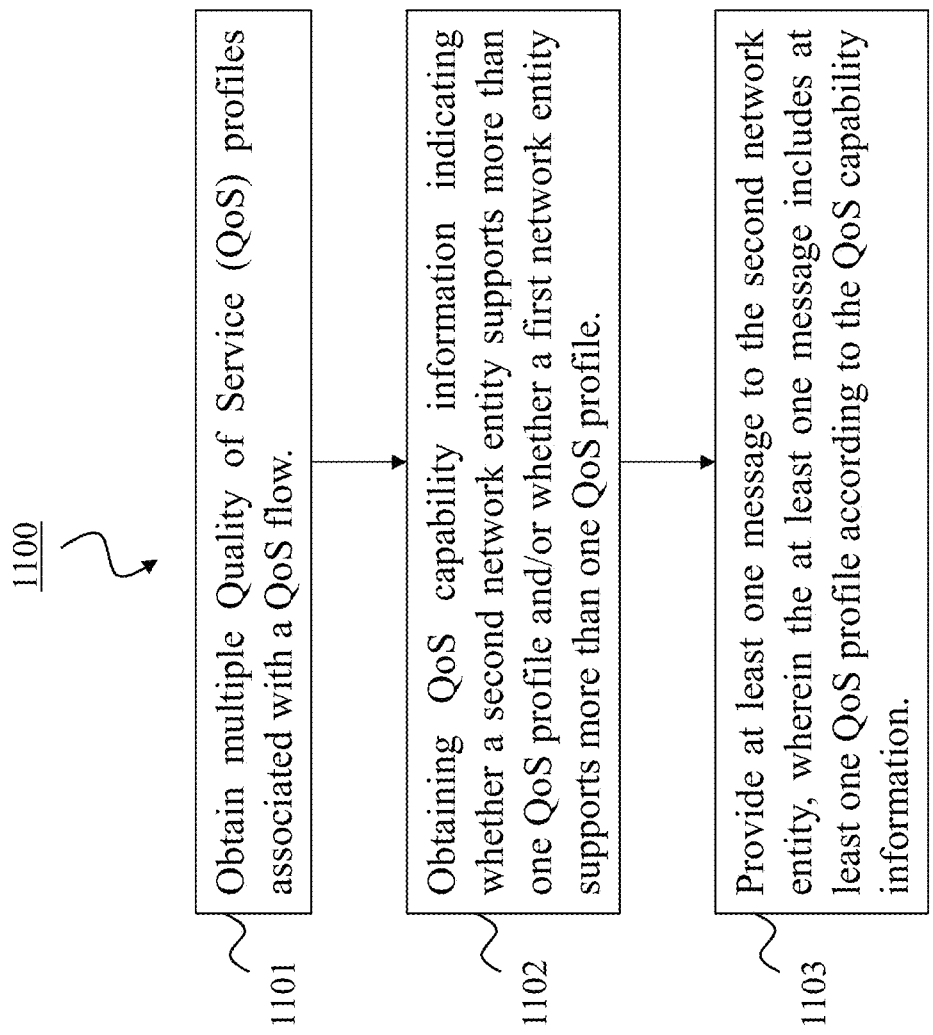
FIG. 11 shows a method according to an embodiment of the disclosure.

FIG. 11 shows a method 1100 according to an embodiment of the disclosure. The method 1100 is for supporting UE 101 HO from the first network entity 110 to the second network entity 200. The method 1100 may be performed by the network entity 100 (e.g., the first network entity 110 or a SMF).

The method 1100 comprises: a step 1101 of obtaining multiple QoS profiles 105 associated with a QoS flow 102; a step 1102 of obtaining QoS capability information 103 indicating whether the second network entity 200 supports more than one QoS profile 105 and/or whether the first network entity 110 supports more than one QoS profile 105; and a step 1103 of providing at least one message 104 to the second network entity 200, wherein the at least one message 104 includes at least one QoS profile 105 according to the QoS capability information 103.

Figure 12:
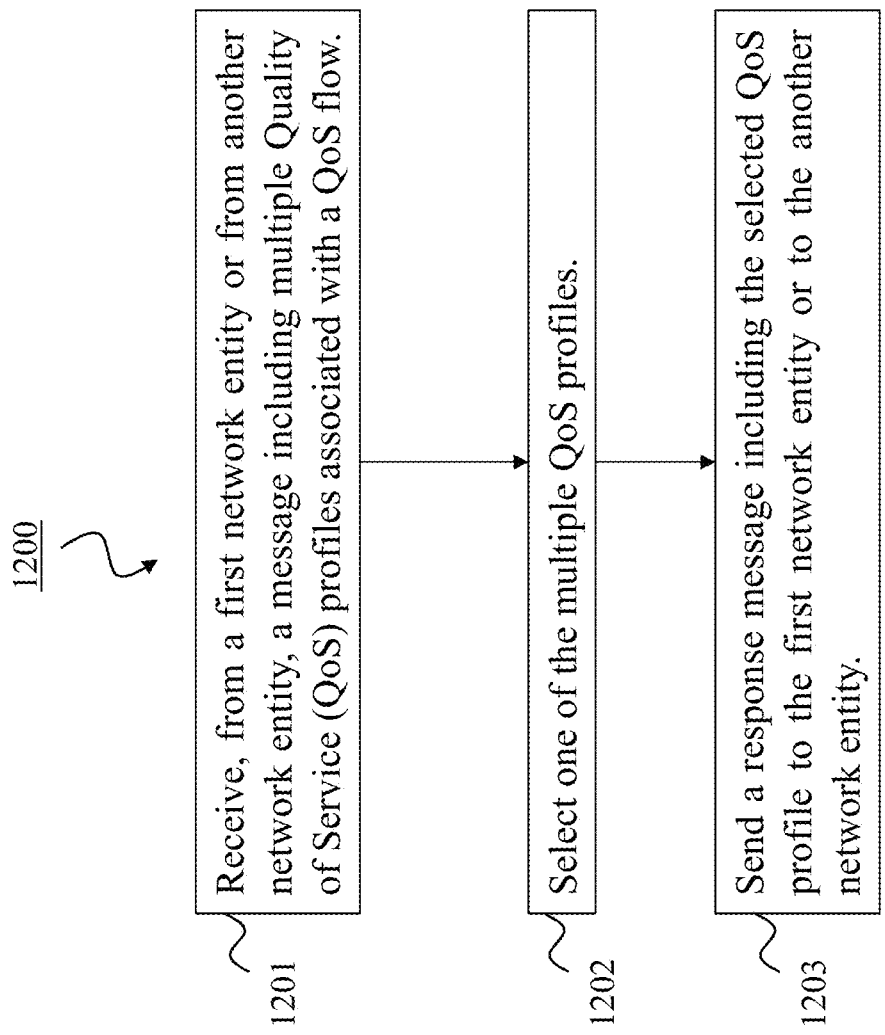
FIG. 12 shows a method according to an embodiment of the disclosure.
Figure 13:
FIG. 13 shows a message sequence for N2-based HO.
Figure 14:
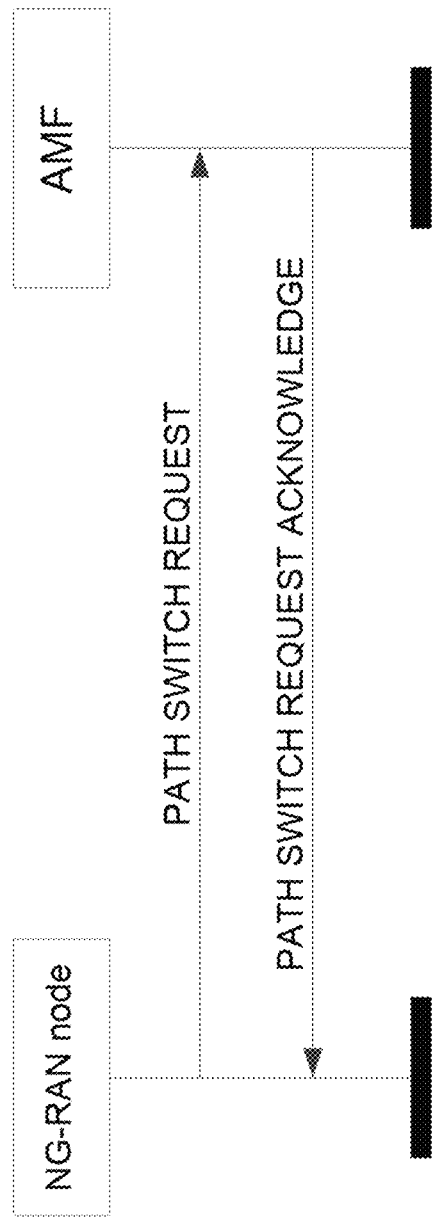
FIG. 14 shows a message sequence for Xn-based HO.

FIG. 12 shows a method 1200 according to an embodiment of the disclosure. The method 1200 is for supporting UE 101 HO from the first network entity 110 to the second network entity 200. The method 1200 may be performed by the second network entity 200.

The method 1200 comprises: a step 1201 of receiving, from the first network entity 110 or from another network entity, a message 201 including multiple QoS profiles 105 associated with a QoS flow 102; a step 1202 of selecting one of the multiple QoS profiles 105; and a step 1203 of sending a response message 202 including the selected QoS profile 105 to the first network entity 110 or to the other network entity.

In the case that a (target) NG-RAN node has stored alternative QoS profile(s), it is proposed to include the alternative QoS profile(s) in the handover request message that is sent from the source NG-RAN node to the target NG-RAN node. This will enable the admission control function of the target NG-RAN node to check an alternative QoS profile that could be fulfilled if the current QoS of the source NG-RAN node cannot be guaranteed.

It is proposed to support alternative QoS profile(s) during UE mobility (i.e., during a HO procedure).

It is proposed to introduce, as an option, the list of alternative QoS flow level QoS parameters in the handover request message.

If one of the alternative QoS profiles have been selected by the target NG-RAN node for one or more QoS flows then the handover request acknowledge message that is sent by the target NG-RAN node to the source NG-RAN node, includes the reference (or index) of the fulfilled QoS profile together the corresponding QoS flow identifier (i.e., admitted QoS flow).

An example of the index of the fulfilled QoS profile is: value 0 indicates initial QoS profile, value 1 indicates the first item of the alternative QoS profile list, value 2 indicates the second item of the alternative QoS profile, and so on about the prepared resources at the target.

It is proposed to introduce, as an option, in the handover request acknowledge message the fulfilled QoS profile for an admitted QoS flow that an alternative QoS profile can be fulfilled by the target NG-RAN node.

The proposed embodiments base on a unique signaling in the radio interface, N2 interface and Xn interfaces, which involves exchange of new messages; messages that are already available are enhanced with new content as well. Additionally, the interactions among the different network entities (e.g., UE 101, RAN nodes 110, 200, Mobility Management, etc.) involves unique messages exchanges and introduction of new NFs.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

A communications apparatus is provided, including at least one of the following: a bus, a processor, a storage medium, a bus interface, a network adapter, a user interface, or an antenna, where the bus is configured to connect the processor, the storage medium, the bus interface, and the user interface; the processor is configured to perform the above method; the storage medium is configured to store an operating system and to-be-sent or to-be-received data; the bus interface is connected to the network adapter; the network adapter is configured to implement a signal processing function of a physical layer in a wireless communications network; the user interface is configured to be connected to a user input device; and the antenna is configured to send and receive a signal.

Another aspect of this application provides a computer-readable storage medium, where the computer-readable storage medium stores an instruction, and when the computer-readable storage medium runs on a computer, the computer performs the above method.

Another aspect of this application provides a computer program product including an instruction, where when the computer program product runs on a computer, the computer performs the above method.

Another aspect of this application provides a computer program, where when the computer program runs on a computer, the computer performs the above method.

Method or algorithm steps described with reference to the content disclosed in this application may be implemented by hardware, or may be implemented by a processor by executing a software instruction. The software instruction may include a corresponding software module. The software module may be stored in a random-access memory (RAM), a flash, a read-only memory (ROM), an erasable programmable ROM (EPROM), an electrically erasable programmable (EEPROM), a register, a hard disk, a removable hard disk, a compact-disc (CD)-ROM, or any other form of storage medium known in the art. For example, a storage medium is coupled to a processor, such that the processor can read information from the storage medium and write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

The foregoing embodiments may be all or partially implemented using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or may be a data storage device, such as a server or a data center, integrating one or more usable media.

The usable medium may be a magnetic medium (for example, a floppy disk, a hard disk, or a magnetic tape), an optical medium (for example, a DVD), a semiconductor medium (for example, a solid-state disk (SSD)), or the like.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A network entity comprising:
a memory configured to store instructions; and
one or more processors coupled to the memory and configured to execute the instructions to cause the network entity to:
obtain quality of service (QoS) profiles associated with a QoS flow;
obtain QoS capability information indicating whether a second network entity and/or a first network entity supports more than one QoS profile in the QoS profiles; and
send at least one message to the second network entity, wherein the at least one message comprises at least one QoS profile in the QoS profiles according to the QOS capability information, and
wherein when the first network entity does not support more than one QoS profile and the second network entity supports more than one QoS profile, the at least one message comprises a session modification message that comprises the QoS profiles and that is sent after completion of a handover (HO) of a user equipment (UE) from the first network entity to the second network entity.

2. The network entity of claim 1, wherein the QoS profiles comprise an active QoS profile and comprise an alternative QoS profile or a preferred QoS profile.

3. The network entity of claim 1, wherein the one or more processors are further configured to execute the instructions to cause the network entity to obtain the QoS capability information via:
receiving a message or a notification; or
an operations, administration, and maintenance (OAM) configuration.

4. The network entity of claim 1, wherein the network entity is the first network entity, wherein when the first network entity supports more than one QoS profile and the second network entity does not support more than one QoS profile, the at least one message comprises request messages, and wherein each of the request messages comprises one of the QoS profiles.

5. The network entity of claim 4, wherein the one or more processors are further configured to execute the instructions to cause the network entity to:
receive at least one acknowledgement message from the second network entity responsive to the request messages, wherein the at least one acknowledgement message comprise respective QoS profiles of the QoS profiles;

select a first QoS profile from the respective QoS profiles; and support the HO based on the first QoS profile.

6. The network entity of claim 5, wherein the one or more processors are further configured to execute the instructions to cause the network entity to inform a core network entity about the first QoS profile.

7. The network entity of claim 2, wherein the network entity is the first network entity, wherein when the first network entity supports more than one QoS profile and the second network entity does not support more than one QoS, the one or more processors are further configured to execute the instructions to cause the network entity to:
 send a request message comprising the QoS profiles to the second network entity;
 receive an acknowledgement message from the second network entity responsive to the request message, wherein the acknowledgement message acknowledges the active QoS profile among the QoS profiles; and
 support the HO based on the active QoS profile.

8. The network entity of claim 7, wherein the one or more processors are further configured to execute the instructions to cause the network entity is to inform a core network entity about the active QoS profile.

9. The network entity of claim 1, wherein the network entity is the first network entity or a session management function (SMF), wherein when the first network entity supports more than one QoS profile and the second network entity does not support more than one QoS profile, the one or more processors are further configured to execute the instructions to cause the network entity to:
 select a first QoS profile from the QoS profiles; and
 send a request message comprising the first QoS profile to the second network entity.

10. The network entity of claim 2, wherein the network entity is a session management function (SMF), wherein when the first network entity does not support more than one QoS profile and the second network entity supports more than one QoS profile, the at least one message further comprises a request message, and wherein the request message comprises the active QoS profile and other QoS profiles in the QoS profiles.

11. The network entity of claim 10, wherein the one or more processors are further configured to execute the instructions to cause the network entity to:
 receive an acknowledgement message comprising a first QoS profile of the QoS profiles from the second network entity; and
 support the HO based on the first QoS profile.

12. The network entity of claim 1, wherein the network entity is a session management function (SMF).

13. The network entity of claim 1, wherein the network entity is the first network entity, wherein when the first network entity and the second network entity support more than one QoS profile, the at least one message comprises a request message comprising the QoS profiles and the one or more processors are further configured to execute the instructions to cause the network entity to:
 receive an acknowledgement message comprising a first QoS profile of the QoS profiles from the second network entity; and
 support the HO based on the first QoS profile.

14. A second network entity comprising:
 a memory configured to store instructions; and
 one or more processors coupled to the memory and configured to execute the instructions to cause the second network entity to:
  receive, from a first network entity or a third network entity, a message comprising quality of service (QOS) profiles associated with a QoS flow;
  select a first QoS profile from the QOS profiles;
  send a response message comprising the first QoS profile to the first network entity or to the third network entity; and
  inform a session management function (SMF) about the first QoS profile after selection of the first QoS profile and/or after completion of a handover (HO) of a user equipment (UE) from the first network entity.

15. The second network entity of claim 14, wherein the one or more processors are further configured to execute the instructions to cause the second network entity to inform a core network entity comprising the SMF about the first QoS profile.

16. The second network entity of claim 15, wherein the one or more processors are further configured to execute the instructions to further cause the second network entity to further inform the core network entity by informing the SMF using a new message or reusing an existing message.

17. The second network entity of claim 14, wherein the one or more processors are further configured to execute the instructions to cause the second network entity to select the first QoS profile from the QoS profiles by selecting:
 an active QoS profile when the active QoS profile is supported by the second network entity; or
 a lower QoS profile than the active QoS profile when the active QoS profile is not supported by the second network entity.

18. The second network entity of claim 17, wherein the one or more processors are further configured to execute the instructions to cause the second network entity is to further select the first QoS profile from the QoS profiles by selecting a higher QoS profile than the active QoS profile when the active QoS profile and the higher QoS profile are supported by the second network entity.

19. A method comprising:
 obtaining multiple quality of service (QOS) profiles associated with a QoS flow;
 obtaining QOS capability information indicating whether a second network entity and/or a first network entity supports more than one QoS profile in the QoS profiles; and
 send at least one message to the second network entity, wherein the at least one message comprises at least one QoS profile according to the QoS capability information, and
 wherein when the first network entity does not support more than one QoS profile and the second network entity supports more than one QoS profile, the at least one message comprises a session modification message that comprises the QoS profiles and that is sent after completion of a handover (HO) of a user equipment (UE) from the first network entity to the second network entity.

20. A method for comprising:
 receiving, from a first network entity or from a third network entity, a message comprising quality of service (QOS) profiles associated with a QoS flow;
 selecting a first QoS profile from the QoS profiles;
 sending a response message comprising the first QoS profile to the first network entity or to the third network entity; and
 informing a session management function (SMF) about the first QoS profile after selection of the first QoS profile and/or after completion of a handover (HO) of a user equipment (UE) from the first network entity.

21. The method of claim 19, wherein the QoS profiles comprise an active QoS profile and comprise an alternative QoS profile or a preferred QoS profile.

\* \* \* \* \*